United States Patent
Fleischer et al.

(10) Patent No.: US 8,972,782 B2
(45) Date of Patent: Mar. 3, 2015

(54) EXPOSED-PIPELINE PROCESSING ELEMENT WITH ROLLBACK

(71) Applicant: International Business Machines Corporation, Armonk, NY (US)

(72) Inventors: Bruce M. Fleischer, Bedford Hills, NY (US); Thomas W. Fox, Hopewell Junction, NY (US); Hans M. Jacobson, White Plains, NY (US); Ravi Nair, Briarcliff Manor, NY (US); Daniel A. Prener, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 13/673,221

(22) Filed: Nov. 9, 2012

(65) Prior Publication Data
US 2014/0136894 A1 May 15, 2014

(51) Int. Cl.
*G06F 11/14* (2006.01)

(52) U.S. Cl.
USPC ................................................. 714/19

(58) Field of Classification Search
CPC . G06F 11/14; G06F 11/1407; G06F 11/0793; G06F 9/3863; G06F 11/0772; G06F 11/00; G06F 9/3865; G06F 15/8053; G06F 9/3001; G06F 9/30094; G06F 9/4812
See application file for complete search history.

(56) References Cited

U.S. PATENT DOCUMENTS

| | | | |
|---|---|---|---|
| 3,287,703 A | 11/1966 | Slotnick | |
| 5,437,043 A | 7/1995 | Fujii et al. | |
| 5,568,380 A * | 10/1996 | Brodnax et al. | 700/79 |
| 5,784,706 A | 7/1998 | Oberlin et al. | |
| 5,832,290 A | 11/1998 | Gostin et al. | |
| 5,903,769 A | 5/1999 | Arya | |
| 5,987,600 A * | 11/1999 | Papworth et al. | 712/244 |
| 6,253,287 B1 | 6/2001 | Green | |
| 6,785,842 B2 * | 8/2004 | Zumkehr et al. | 714/17 |
| 6,839,828 B2 | 1/2005 | Gschwind et al. | |
| 6,889,307 B1 | 5/2005 | Scheuerlein | |
| 6,950,923 B2 | 9/2005 | O'Connor et al. | |
| 7,243,262 B2 * | 7/2007 | Mukherjee et al. | 714/15 |
| 7,277,988 B2 | 10/2007 | Gower et al. | |
| 7,308,607 B2 * | 12/2007 | Reinhardt et al. | 714/25 |
| 7,467,288 B2 | 12/2008 | Glossner, III et al. | |
| 7,493,516 B2 * | 2/2009 | Ferren et al. | 714/10 |
| 7,584,336 B2 | 9/2009 | Tremaine | |

(Continued)

OTHER PUBLICATIONS

"Cell Architecture Explained Version 2," retrieved from http://www.blachford.info/computer/Cell/Cell0_v2.html on Jul. 23, 2012; pp. 1-3.

(Continued)

*Primary Examiner* — Nadeem Iqbal
(74) *Attorney, Agent, or Firm* — Cantor Colburn LLP (57) ABSTRACT

An aspect includes providing rollback support in an exposed-pipeline processing element. A method for providing rollback support in an exposed-pipeline processing element includes detecting, by rollback support logic, an error associated with execution of an instruction in the exposed-pipeline processing element. The rollback support logic determines whether the exposed-pipeline processing element supports replay of the instruction for a predetermined number of cycles. Based on determining that the exposed-pipeline processing element supports replay of the instruction, a rollback action is performed in the exposed-pipeline processing element to attempt recovery from the error.

19 Claims, 7 Drawing Sheets

(56) References Cited

U.S. PATENT DOCUMENTS

| | | |
|---|---|---|
| 7,594,055 B2 | 9/2009 | Gower et al. |
| 7,783,860 B2 | 8/2010 | Luick et al. |
| 7,877,582 B2 | 1/2011 | Gschwind et al. |
| 7,908,460 B2 | 3/2011 | Liao et al. |
| 7,949,853 B2 | 5/2011 | Sandon et al. |
| 8,255,745 B2* | 8/2012 | Ferren et al. ............ 714/19 |
| 8,489,919 B2* | 7/2013 | Clark et al. ............ 714/11 |
| 2006/0143509 A1 | 6/2006 | Okawa |
| 2007/0050661 A1* | 3/2007 | Ferren et al. ............ 714/1 |
| 2008/0005479 A1 | 1/2008 | Tremaine |
| 2009/0106526 A1 | 4/2009 | Luick et al. |
| 2010/0036994 A1 | 2/2010 | Resnick |
| 2010/0268987 A1* | 10/2010 | Clark et al. ............ 714/16 |
| 2010/0332764 A1 | 12/2010 | Jouppi |
| 2011/0246828 A1 | 10/2011 | Monchiero et al. |
| 2011/0264858 A1 | 10/2011 | Jeddeloh et al. |
| 2012/0047398 A1* | 2/2012 | Vera et al. ............ 714/17 |

OTHER PUBLICATIONS

A. Fawibe, et al., "New Memory Organizations for 3D DRAM and PCMs," Archictecture of Computing Systems, ARCS 2012—25th International Conference, Proceedings Publication Date: Feb. 29, 2012; pp. 1-12.

H. P. Hofstee, et al., "Power Efficient Processor Architecture and the Cell Processor," IEEE Computer Society 2005; Proceedings of the 11th Int'l Symposium on High-Performance Computer Architecture; pp. 1-5.

IBM, "Logic on DIMM," ip.com; ip.com No. IPCOM000191776D; Jan. 14, 2010; pp. 1-4.

Wikipedia, "Cell (microprocessor)," retrieved from http://en.wikipedia.org/wiki/Cell_%microprocessor%29 on Jul. 23, 2012; pp. 1-17.

* cited by examiner

EXPOSED-PIPELINE PROCESSING ELEMENT WITH ROLLBACK

BACKGROUND

The present invention relates generally to computer processing and memory, and more particularly to an exposed-pipeline processing element with rollback.

Computer systems often require a considerable amount of high speed memory, such as random access memory (RAM), to hold information, such as data and programs, when a computer is powered and operational. Memory device demands have continued to grow as computer systems have increased performance and complexity.

Computer systems can include local memory within processors as well as memory devices external to the processors. Processors that include large register files typically require a large amount of internal memory. Register files and processing pipelines within processors can be susceptible to soft errors such as bit flips. Rates of soft errors may be small per processor or per memory device but can become a significant reliability issue in large computer systems with complex and long-running programs. Inefficient or ineffective detection and correction of soft error conditions can reduce overall computer system performance. Recovering from errors in processors that use chained results which are not stored to registers may not be readily supported in typical computer systems.

SUMMARY

Exemplary embodiments include a method for providing rollback support in an exposed-pipeline processing element. The method includes detecting, by rollback support logic, an error associated with execution of an instruction in the exposed-pipeline processing element. The rollback support logic determines whether the exposed-pipeline processing element supports replay of the instruction for a predetermined number of cycles. Based on determining that the exposed-pipeline processing element supports replay of the instruction, a rollback action is performed in the exposed-pipeline processing element to attempt recovery from the error.

Additional exemplary embodiments include a method for rollback support in an exposed-pipeline processing element in an active memory device. The method includes saving a checkpoint of the exposed-pipeline processing element to memory of the active memory device and detecting an error associated with execution of an instruction in the exposed-pipeline processing element. Rollback support logic determines whether the exposed-pipeline processing element supports replay of the instruction for a predetermined number of cycles. Based on determining that the exposed-pipeline processing element supports replay of the instruction, a rollback action is performed in the exposed-pipeline processing element to attempt recovery from the error. Based on the determining that the exposed-pipeline processing element does not support replay of the instruction, an exception is triggered to restore the exposed-pipeline processing element to the checkpoint from the memory of the active memory device.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An embodiment is directed to an exposed-pipeline processing element with rollback support. In a processing element that includes multiple processing pipelines and supports chaining of a result from one pipeline to another without saving the result to a register, improvements in energy consumption per computation can be realized over conventional microprocessor designs. The processing element can provide access to vector registers through local element counters. Exposing the pipeline sequence of the processing element places responsibility on a compiler or user to schedule instructions to control chaining and register use. In exemplary embodiments, an exposed-pipeline processing element includes rollback support such that instructions in the pipeline can be re-executed when a soft error is detected. Replay buffers may be added to each pipeline operand. Replay buffers may also or alternatively be included at pipeline result stages in combination with shadow counters. Shadow counters can retain a recent history of counters associated with register files for a previous number of cycles. Further efficiencies may be achieved using a one-hot circular buffer that is responsive to control signal changes to maintain the shadow counters.

The exposed-pipeline processing element with rollback can be implemented in an active memory device. The active memory device may be any suitable memory device including a plurality of memory elements (e.g., chips) connected to a logic portion and a processing element. In an embodiment, the active memory device includes layers of memory that form a three dimensional ("3D") memory device (e.g., a memory cube) where individual columns of chips form vaults in communication with the processing element and logic. The active memory device may include a plurality of processing elements configured to communicate to the chips and other processing elements. In an embodiment, a processing element accesses a selected address in a vault through an interconnect network. In addition, the interconnect network provides a communication path between processing elements and vaults on the active memory device as well as between processing elements and a main processor. Each vault may have an associated memory controller or logic unit that is also coupled to the interconnect network.

Embodiments include an active memory device that can perform a complex set of operations using multiple locations (e.g., data stored at specific addresses) within the active memory device as operands. Further, a process is provided whereby the instructions and operations are performed autonomously on these operands within the active memory device. Specifically, the instructions are stored within the active memory device itself and are not executed by a main processor. The stored instructions are provided to the processing elements for processing by the processing element in the active memory device. In one embodiment, the processing elements are programmable engines, including an instruction buffer, an instruction unit with branching capability and instruction decode, a mixture of vector, scalar, and mask register files, a plurality of load/store units for the movement of data between memory and the register files, and a plurality of execution units for the arithmetic and logical processing of various data types. Also included in the active memory device are address translation capabilities for converting virtual addresses to physical addresses, a unified Load/Store Queue to sequence data movement between the memory and the processing elements, and a processor communications unit, for communication with the main processor.

In an embodiment, the active memory device is configured to load configuration information or instructions from a part of the active memory device into a processing element following receiving a command from an external requestor, such as a main processor or another processing element. In addition, the processing element may perform virtual-to-real address translations that are computed while executing the loaded instructions. In an example, when performing a load instruction, the active memory device accesses an operand from a memory location and places the operand in a register in the processing element. A virtual address of the memory location is generated by the load instruction and is translated into a real address by the processing element. Similarly, when performing a store instruction, the active memory device writes a memory location with the contents (e.g., an operand) in a register in the processing element. A virtual address of the memory location is generated by the store instruction and is translated into a real address by the processing element.

Embodiments of the processing element in the active memory device also have the ability to read or to write operands in any part of the active memory device through the interconnect network. Specifically, a processing element may access other vaults in the active memory device using the interconnect network. In an embodiment, processing elements are pooled and coupled to the vaults via the interconnect network, where the processing elements are not physically located in the vault stack. In an embodiment, the interconnect network is a coupling device, such as a crossbar switch, configured to connect any processing element to any memory vault, provided the processing element and memory vault are coupled to the interconnect. In an embodiment, the interconnect network may couple a plurality of active memory devices, where the interconnect network provides a communication path between processing elements and memory vaults of separate devices.

In one embodiment, the processing element is included with the memory controller as part of the stack. In addition, the processing element may perform complex arithmetic and logic operations on the operands, and read and write end results back to locations in memory. The active memory device may return a single result value or signal to the main processor indicating that the results of the desired complex operation are ready in the active memory device, thus performing the high bandwidth processing on the active memory device and using a lower bandwidth communication between the active memory device and main processor.

The processing capabilities within an active memory device may reduce memory latency and energy consumption that would otherwise be experienced when memory is accessed by a processor residing in a separate chip. Instead of bringing data from memory to the separate processing chip through lower bandwidth communication paths, performing what is often quite simple calculations on the data, and then transferring the processed data back to memory, the main processor can configure the processing elements within the active memory device, and then instruct them to carry out the data processing tasks. This may be achieved by sending one or more commands from the main processor to the active memory device. In this scenario, the movement of data between the location where the data processing is performed and memory is greatly reduced, both in the distance it has to travel from the memory to the data processing location, and in the number of levels of cache traversed through a memory hierarchy.

Figure 1:
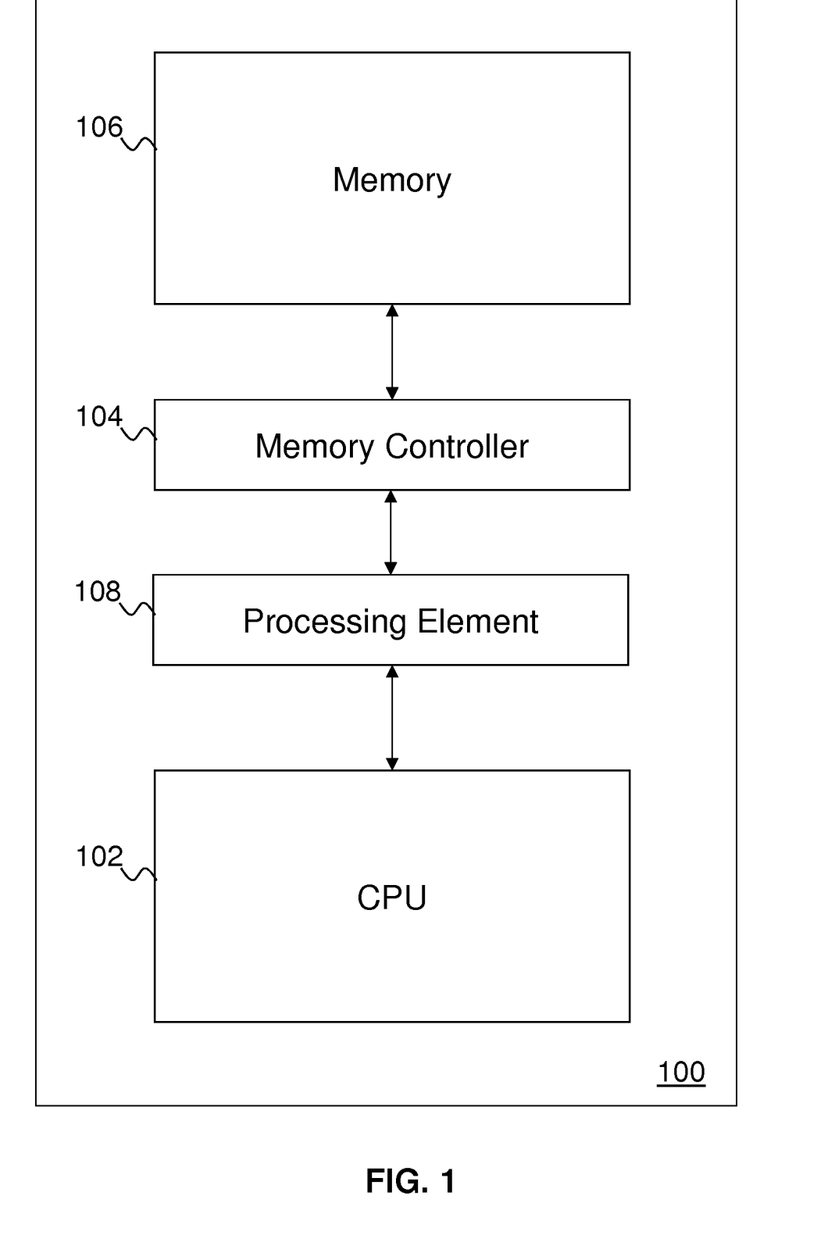
FIG. 1 illustrates a block diagram of a system for active memory in accordance with an embodiment.

FIG. 1 illustrates a block diagram of a system for storing and retrieving data in a memory in accordance with an embodiment. A system 100 depicted in FIG. 1 includes a computer processor (CPU) 102, a memory 106 having memory devices, as well as a memory controller 104 and processing element 108 for receiving and processing data from the computer processor 102 to be stored in the memory 106.

The memory controller 104 may be in communication with the computer processor 102 and receive write requests from the computer processor 102 without using functions of the processing element 108. The write requests contain data to be written to the memory 106 and a real address for identifying the location in the memory 106 to which the data will be written. The memory controller 104 stores data at a real address within the memory 106. The computer processor 102 can map the virtual address to a real address in the memory 106 when storing or retrieving data. The real address for a given virtual address may change each time data in the memory 106 is modified.

In an embodiment, the processing element 108 is in communication with the computer processor 102 and receives a command from the computer processor 102. The command may correspond to instructions stored in the memory 106 to perform write requests for data to be written to the memory 106. The command may also include a virtual address for identifying the location in the memory 106 to which the data will be written. The memory controller 104 and/or processing element 108 stores data at a real address within the memory 106. In an embodiment, the processing element 108 maps the virtual address to a real address in the memory 106 when storing or retrieving data. As described in further detail below, the computer processor 102 provides commands to the memory 106, where the processing element 108 receives the command and fetches corresponding instructions from the memory 106. The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 and/or processing element 108 via a network). In addition, portions of the processing described herein may span one or more of the memory 106, memory controller 104, processing element 108 and computer processor 102.

Figure 2:
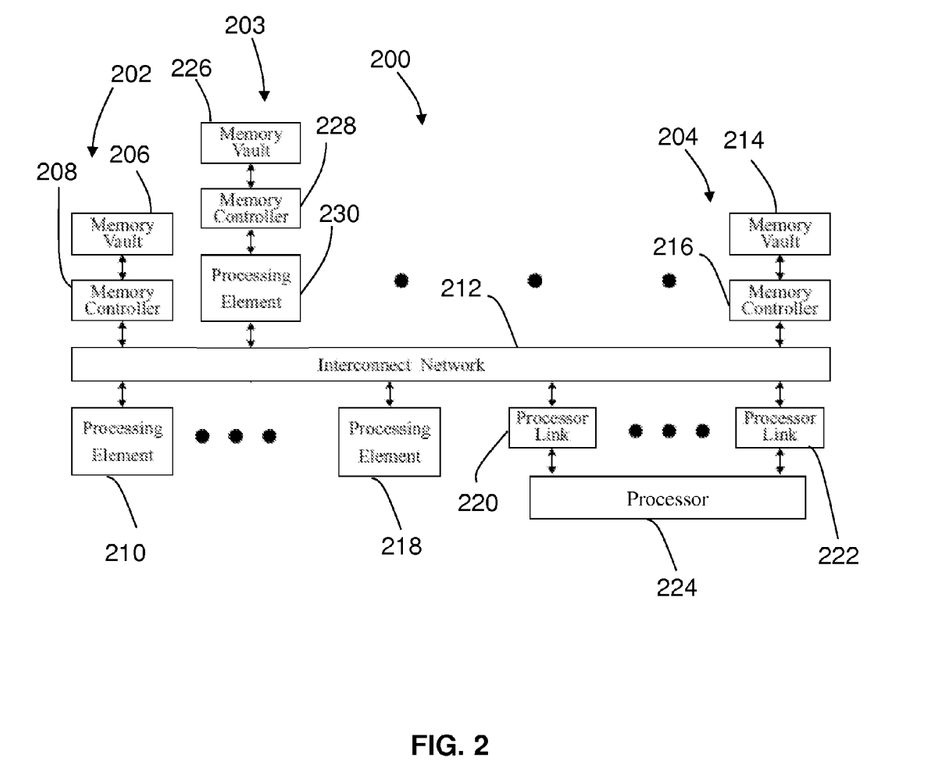
FIG. 2 illustrates a block diagram of a memory system with active memory in accordance with an embodiment.

FIG. 2 is a schematic diagram of an embodiment of a computer system 200 implementing active memory. In one embodiment, the computer system 200 includes an active memory device 202, an active memory device 203 and an active memory device 204. The active memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active memory devices 203 and 204, via the interconnect network 212. The interconnect network 212 is also coupled to a main processor 224 by processor links 220 and 222. The interconnect network 212 provides a fast and high bandwidth path for communication between portions of the device, such processing elements, memory controllers and memory, to provide improved performance and reduced latency for the active memory.

The active memory device 203 includes a memory vault 226, a memory controller 228 and a processing element 230. In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active memory 204 includes a memory vault 214 and memory controller 216 coupled to processing element 210 and processing element 218 via the interconnect network 212. As depicted, the processing element 218 is located on the other side of the interconnect network 212 from the memory controller 216 and memory vault 214. In embodiments, the active memory devices 202, 203 and 204 include multiple layers of stacked addressable memory elements. Further, the stacks memory may be divided into memory vaults 206, 226 and 214, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 226 and 214. In another embodiment, one or more processing element, such as processing element 230, is located as part of a stack including a memory vault 226 and memory controller 228. In such a configuration, the processing element 230 is configured to access memory vault 226 coupled to the interconnect network 212, including memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 226 and 214.

In an embodiment, the computer system may include a plurality of active memory devices, such as the active memory devices 202, 203 and 204. Further, each active memory device may include a plurality of stacks, each stack including a memory vault, memory controller and associated processing element. In one example, the number of processing elements may be greater than the number of memory vaults. In another embodiment, the memory devices may include fewer processing elements than memory vaults. In embodiments, the processing elements are pooled and available to access any memory in the system. For example, a memory device may include 16 memory vaults and memory controllers, but only eight processing elements. The eight processing elements are pooled, and utilized as resources for accessing any memory vaults coupled to the interconnect network. In another example, a memory device may be passive, where the device is controlled by processing elements of active memory devices coupled to the interconnect network.

Figure 3:
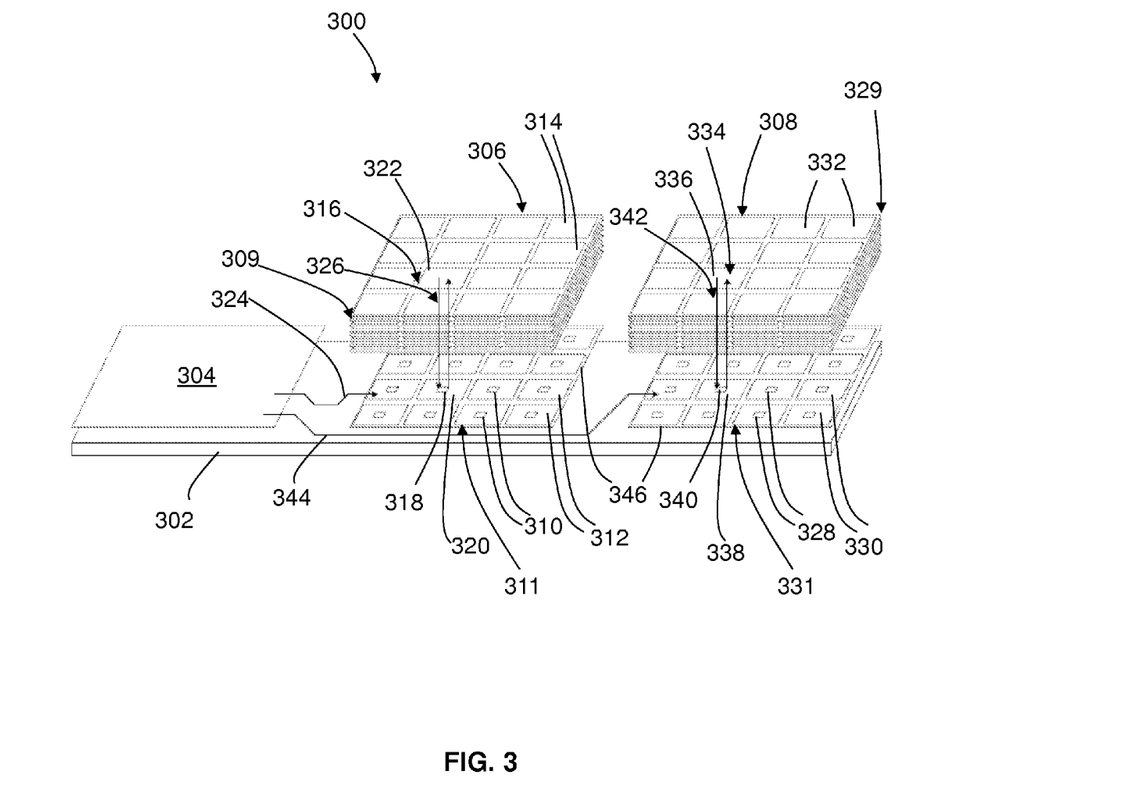
FIG. 3 illustrates a schematic diagram of a memory system with active memory in accordance with an embodiment.

FIG. 3 is a diagram of an exemplary computer system 300 implementing active memory. The computer system 300 includes a circuit board 302, a main processor 304, active memory device 306 and active memory device 308. The active memory device 306, active memory device 308 and main processor 304 are disposed on the circuit board 302. As depicted, portions of the active memory devices 306 and 308 are exploded to show details of the computer system 300 arrangement. The active memory devices 306 and 308 communicate to the main processor 304 via signal paths 324 and 344, respectively. As depicted, the active memory 306 device is arranged in layers, where a base layer 311 includes a plurality of memory controllers 310 and processing elements 312. For example, the active memory device 306 includes layers 309 of memory placed on top of the base layer 311, where the layers 309 each have a plurality of memory elements. As depicted, the base layer 311 also includes an interconnect network 346 to enable high bandwidth communication between memory, memory controllers and processing elements in the device.

In an embodiment, the active memory device 306 includes a plurality of memory vaults 314, where each memory vault 314 includes a memory element from each layer 309, the memory vaults 314 positioned adjacent to memory controllers 310 and processing elements 312. Specifically, the exemplary active memory device 306 includes layers of 16 memory elements, where the element layers form stacks, including a stack 316, where the stack 316 includes a memory vault 322 disposed above a memory controller 318 and a processing element 320. A high bandwidth communication path 326 provides a high bandwidth, direct and substantially reduced length (e.g., as compared to paths 324, 344) communication path between the processing element 320 and memory locations within the memory vault 322, thus reducing latency and power consumption for memory accesses. For example, the processing element 320 may receive a command from the main processor 304, load instructions from within the active memory device 306 based on the command, and, as part of the loaded instructions, access data at a location in the memory vault 314 and perform a complex operation on the data in the processing element 320. Further, the processing element 320 may also store data, such as the result, in the memory vault 314 and transmit a value or signal to the main processor 304 following execution of the command. In an embodiment, the processing element 320 stores or writes data (e.g. an operand) from a register in the processing element 320 to the memory vault 314. The processing element 320 is also configured to translate addresses from virtual-to-real and real-to-virtual as part of the read or store operations. Thus, the processing element 320 provides instruction loading, address translation, complex operations and other tasks local to the memory to reduce latency, save power and free up the main processor 304 to perform other tasks.

Similarly, the active memory device 308 includes a plurality of memory controllers 328 and processing elements 330 disposed on a base layer 331. In an embodiment, the active memory 308 includes layers 329 of memory devices placed on top of the base layer 331, where the layers 329 each have a plurality of memory devices. The base layer 331 also includes an interconnect network 346 to enable high bandwidth communication between memory and processing elements in the device. In an embodiment, the interconnect networks 346 of active memory device 306 and active memory device 308 are coupled and allow communication between processing elements and memory on separate devices.

In an embodiment, the active memory device 308 includes a plurality of memory vaults 332, where each memory vault 332 includes a memory element from each layer 309, the memory vaults 332 are positioned adjacent to memory controllers 328 and processing elements 330. The exemplary active memory device 308 includes 16 stacks, including stack 334, where the stack 334 includes a memory vault 336 disposed above a memory controller 340 and a processing element 338. A high bandwidth communication path 342 provides communication between the processing element 330 and memory locations within the memory vault 336.

Figure 4:
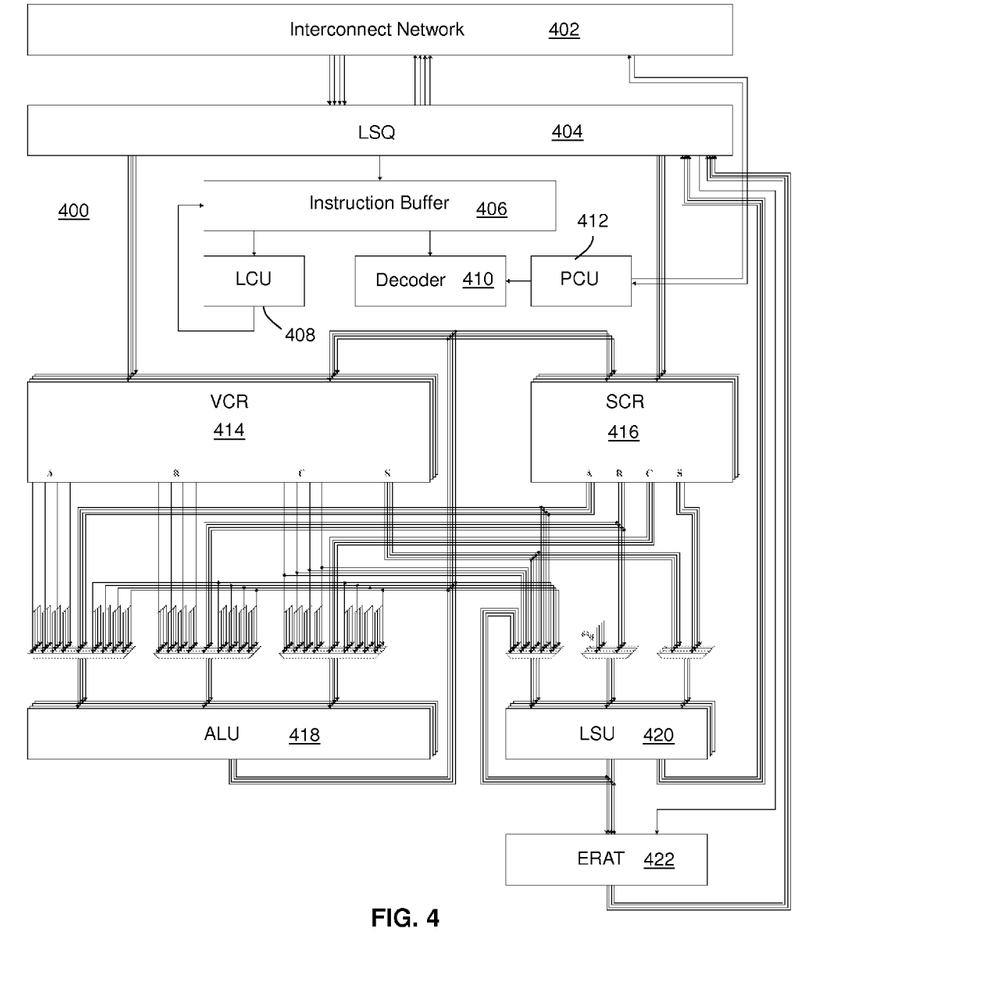
FIG. 4 illustrates a block diagram of a processing element in an active memory device in accordance with an embodiment.

FIG. 4 depicts an example of a processing element 400 coupled to an interconnect network 402 as an embodiment of one of the processing elements of FIGS. 1-3. The processing element 400, also referred to as exposed-pipeline processing element 400, can be situated in an active memory device, such as one of the active memory devices of FIGS. 1-3. The pipeline sequence of the processing element 400 is exposed such that a programmer or compiler can establish execution sequencing of low level instructions within the processing element 400. In the example of FIG. 4, the processing element 400 includes a load-store queue (LSQ) 404 coupled to the interconnect network 402 and to an instruction buffer 406. The instruction buffer 406 is also coupled to a lane control unit (LCU) 408 and a decoder 410. A processor communication unit (PCU) 412 provides a communication interface between the processing element 400 and the main processor or other processing elements through the interconnect network 402. The LSQ 404 is also coupled to a vector computation register file (VCR) 414 and a scalar computation register file (SCR) 416. The VCR 414 and SCR 416 are coupled through multiple multiplexers to an arithmetic logic unit (ALU) 418 and a memory-access unit 420, also referred to as a load-store unit (LSU) 420. The ALU 418 is coupled to itself and to the LSU 420 through multiplexers, and is also coupled to the VCR 414 and the SCR 416. The LSU 420 may also be coupled to itself, to the LSQ 404, to an effective-to-real address translation unit (ERAT) 422, to the VCR 414 and to the SCR 416 (all connections not depicted). The ERAT 422 is also coupled to the LSQ 404. As will be appreciated, numerous other connections and elements can be included in the processing element 400. For example, connections between the decoder 410 and other elements are not depicted for clarity. Additionally, depicted connections in FIG. 4 can be modified or omitted, such as the depicted connection between decoder 410 and PCU 412.

The processing element 400 supports an instruction set architecture including a broad range of arithmetic capabilities on many data types. Vector processing capabilities of the processing element 400 allows for single instruction, multiple data (SIMD) in time, while SIMD in a spatial dimension is also supported. The instruction buffer 406 holds instructions (also referred to as "lane instructions"), which are fetched and executed in order subject to branching.

In an embodiment, each lane instruction contains 9 sub-instructions for execution in various units within the processing element 400. An iteration count may be included within the lane instruction, allowing the sub-instructions to be repeated up to a predetermined number of times (e.g., up to 32 times). This facilitates SIMD in time. The LCU 408 can manage the iteration count and determine when to advance to a next instruction or repeat execution of the same instruction. In an embodiment, arithmetic pipelines of ALU 418 are 64 bits wide, and spatial SIMD is supported by virtue of the ability to execute data types smaller than 64 bits in parallel, simultaneously as multiple execution slots. For example, assuming that a lane instruction includes 9 sub-instructions, execution of the sub-instructions can be performed in the LCU 408 for lane control, and in four processing slices, each of which includes an ALU 418 and an LSU 420. Pairs of the VCR 414 and the SCR 416 can be implemented per processing slice and are accessible by each pair of the ALU 418 and LSU 420. Accordingly, the VCR 414, SCR 416, ALU 418, LSU 420, and associated multiplexers are depicted as stacks of four elements to indicate 4 processing slices in the example of FIG. 4.

At the processing slice level, computation can occur on floating-point and fixed-point data types at, for example, a 64-bit granularity in a temporal SIMD manner on 64-bit vector elements, and in a temporal and spatial SIMD manner on narrower vector sub-elements, which can be 32-bits, 16-bits, or 8-bits wide.

Each processing slice within the processing element 400 includes a memory access pipeline (load/store pipeline) and an arithmetic pipeline. Managing flow through the LSU 420 as a load/store pipeline can enable computation of one address per vector data element or sub-element. The processing element 400 provides the ability to perform associated fixed-point effective address (i.e., virtual address) computations. The arithmetic pipeline through the ALU 418 can include a robust assortment of floating-point and fixed-point operations to support a variety of workloads.

The LSU 420 may support load and store operations of, for example, 8, 4, 2 and 1 byte(s) and load and store operations of 4, 2, and 1 byte(s) to and from registers with packed data.

The ALU 418 may support copy operations between register files, arithmetic, rounding and conversion, comparison, and maximum and minimum operations on floating-point data types of double-precision (64 bits) and single-precision (32 bits), and arithmetic, rotate/shift, comparison, logical, count leading zeros, and ones population count operations on fixed-point data types of doubleword (64 bits), word (32 bits), halfword (16 bits) and bytes (8 bits).

In an embodiment, the computational model of a processing slice within the processing element 400 is a vector single instruction multiple data (SIMD) model with the VCR 414 and SCR 416. The VCR 414 can support multiple dimensions of registers, while the SCR 416 supports a single dimension of registers. For example, the VCR 414 can include 16 vector register entries with 32 elements each of 64 bits, and the SCR 416 can include 16 register entries with 1 element each of 64 bits, although numerous other configurations may be supported. A variable number of execution slots can be used, operating on an equal number of sub-elements, whereby the sub-elements taken together add up to one register element (either VCR 414 or SCR 416) of 64 bits in this example. The number of execution slots and the corresponding number of vector sub-elements depend upon the data type of the instruction. Examples of data types and sizes of various formats include: floating-point with double-precision (64-bit) and single-precision (32-bit) data types and fixed-point for a doubleword (64-bit), word (32-bit), halfword (16-bit), and byte (8-bit) data types.

Figure 5:
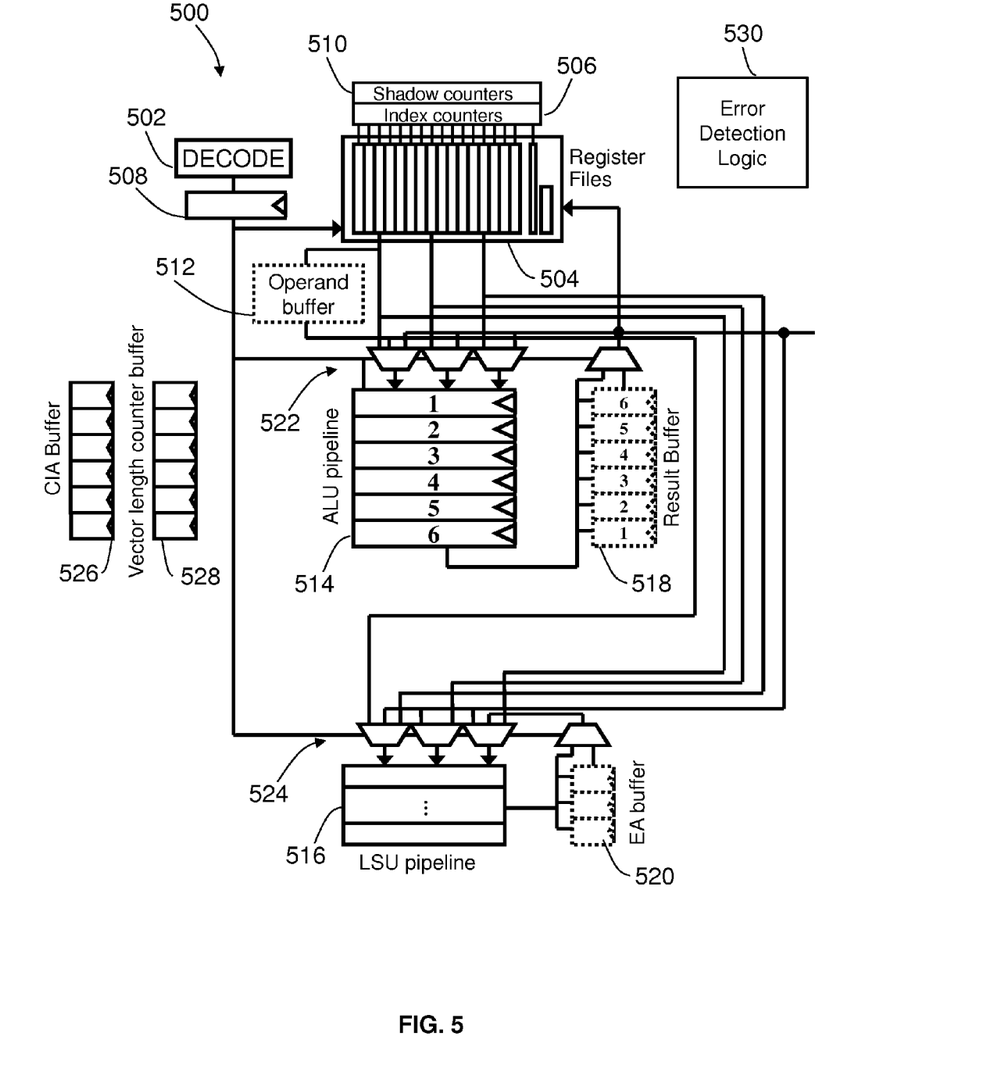
FIG. 5 illustrates a block diagram of rollback support logic in a processing element in accordance with an embodiment.

A number of rollback support features may be included in the processing element 400. FIG. 5 depicts rollback support logic 500 that may be included in the processing element 400. Decode logic 502 may be incorporated in the decoder 410 of FIG. 4. Register files 504 may be an embodiment of the VCR 414 of FIG. 4. The register files 504 can include multiple vector registers, each of which includes a fast, dense memory array of elements, and index counters 506 to access elements through read/write ports. An address from decode logic 502 is latched at latch 508 to address a particular vector register in the register files 504, and the index counters 506 are used to address a particular element within a vector register. Shadow counters 510 can store previous values of the index counters 506 in support of rollback to a previous state for accessing the register files 504.

The rollback support logic 500 may also include an operand buffer 512 to store a recent history of operands in support of rollback. An ALU pipeline 514, which appears as six stages in FIG. 5, represents an exposed pipeline of the ALU 418 of FIG. 4. Similarly, an LSU pipeline 516 represents an exposed pipeline of the LSU 420 of FIG. 4. Result buffer 518 stores a recent history of results from the ALU pipeline 514. Similarly, effective address (EA) buffer 520 stores a recent history of results from the LSU pipeline 516. A series of multiplexers 522 allows the ALU pipeline 514 to receive inputs from the register files 504, the operand buffer 512, or the result buffer 518. Similarly, a series of multiplexers 524 allows the LSU pipeline 516 to receive inputs from the register files 504, the operand buffer 512, the result buffer 518, or the EA buffer 520. The operand buffer 512 is depicted on a single port of the register files 504 and interfacing to a single multiplexer of the multiplexers 522 and 524 to reduce drawing clutter in FIG. 5; however, the operand buffer 512 is coupled to multiple ports on the register files 504 as well as to all of the multiplexers 522 and 524 to store a plurality of operands.

The rollback support logic 500 can also include a current instruction address (CIA) buffer 526 and a vector length counter buffer 528. The CIA buffer 526 provides a recent history of instruction addresses to support rollback. The vector length counter buffer 528 provides a recent history of vector length for the instructions tracked in the CIA buffer 526.

In an embodiment, the rollback support logic 500 also includes error detection logic 530. The error detection logic 530 may detect soft errors, such as bit flips, in the decode logic 502, register files 504, ALU pipeline 514, LSU pipeline 516, and/or in other components of the processing element 400 of FIG. 4.

When implemented in the processing element 400 of FIG. 4, the rollback support logic 500 can correctly rollback the processing element 400 by several cycles so that if a soft error is detected, instructions in the pipelines can be re-executed without the performance impact of restoring from a checkpoint. A checkpoint is a previously saved state of the processing element 400 that is stored external to the processing element 400. Checkpoints can include a number of additional values beyond what is captured in rollback buffers, such as all data in the register files 504, and therefore can take substantially longer for recovery as compared to a rollback. Checkpoints can also be used to save the state of software applications running on other processing elements and processors, such as processor 224 and processing elements 210, 218, and 230 of FIG. 2. Checkpoints may be saved in memory external to the active memory device of the processing element 400 to support restoring the system to a known state.

Although a number of rollback support features are depicted in FIG. 5, the rollback support logic 500 need not include all of the depicted rollback support features. For example, in an embodiment, one or more of the shadow counters 510, and buffers 512, 518, 520, 526, and 528 are omitted, such that the decode logic 502 and the error detection logic 530 are included. In this embodiment, the error detection logic 530 can notify the decode logic 502 that an error has been detected, and the decode logic 502 can determine what buffers are needed to support rollback. In the absence of a buffer needed to support the current rollback requirement, an exception can be triggered to initiate a recovery sequence from a previous checkpoint.

Values can be selectively stored to rollback buffers to reduce power consumption associated with unnecessary clock activity. For example, the decode logic 502 can determine whether an ALU result or LSU result is used as an operand, and store the ALU result to the result buffer 518 and the LSU result to the EA buffer 520. The decode logic 502 can also detect an instruction bit that indicates whether an instruction supports rollback. For example, a compiler can determine that an instruction result will change a value in the register files 504 while an instruction using an old value is subject to possible rollback and replay. The compiler can set a hint bit in the instruction to trigger the decode logic 502 to activate the operand buffer 512 to store the old value in support of rollback and replay. Compiler can also use an architected instruction bit to indicate to the decode logic 502 whether a particular instruction supports rollback, such that the decode logic 502 can trigger a rollback and replay action upon the error detection logic 530 detecting an error associated with execution of the instruction or trigger an exception to restore the processing element 400 to a previously stored checkpoint.

The architected instruction bit or bits can be determined by static code analysis before the instructions are executed. At compile time, different coding choices can be evaluated based on differences in the degree of supported replay. A compiler may, with a model that includes expected soft error rates, system size and checkpoint frequency, weigh these opposing effects on performance to determine which choice will perform better in the presence of soft errors. In addition, another instruction bit can indicate that replay does not need to use the result buffer 518 or the EA buffer 520, and the decode logic 502 can save power by placing the result buffer 518 and/or the EA buffer 520 in a low power state. This instruction bit can also be determined by static code analysis.

Figure 6:
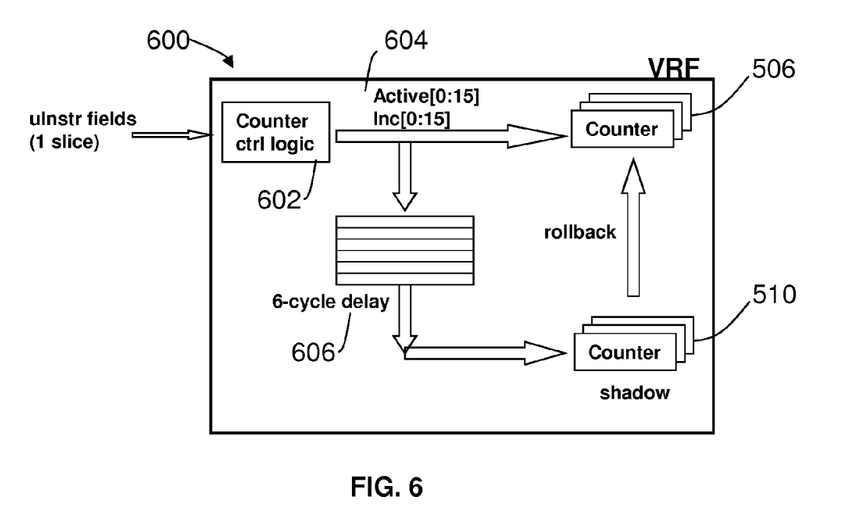
FIG. 6 illustrates a block diagram of a vector register file supporting rollback in accordance with an embodiment.

FIG. 6 depicts an embodiment of a vector register file 600 that may be included within the register files 504 of FIG. 5. The vector register file 600 depicted in FIG. 6 receives microinstruction fields for a single processing slice, such as a processing slice of the processing element 400 of FIG. 4. The vector register file 600 includes counter control logic 602 that generates counter control signals 604 for the index counters 506. The counter control signals 604 are also passed through a multi-cycle delay 606 to the shadow counters 510. In the example of FIG. 6, there are sixteen index counters 506 that can be updated in parallel. The shadow counters 510 remain a fixed number of cycles behind the index counters 506, six cycles in the example of FIG. 6. When the rollback support logic 500 of FIG. 5 initiates a rollback, the values in the shadow counters 510 are copied into the index counters 506. Delaying the counter control signals 604 creates a delayed version of the index counters 506 without storing all of the past values of the index counters 506. In an alternate embodiment, the shadow counters 510 include multiple previous versions of the index counters 506 such that a variable number of rollback cycles can be directly supported.

The counter control signals 604 can include active and increment signals, where active signals act as clock enables to latch updated values in the index counters 506 and the shadow counters 510. The increment signal can indicate whether to increment or reset the index counters 506 and the shadow counters 510 when the active signal is asserted.

Figure 7:
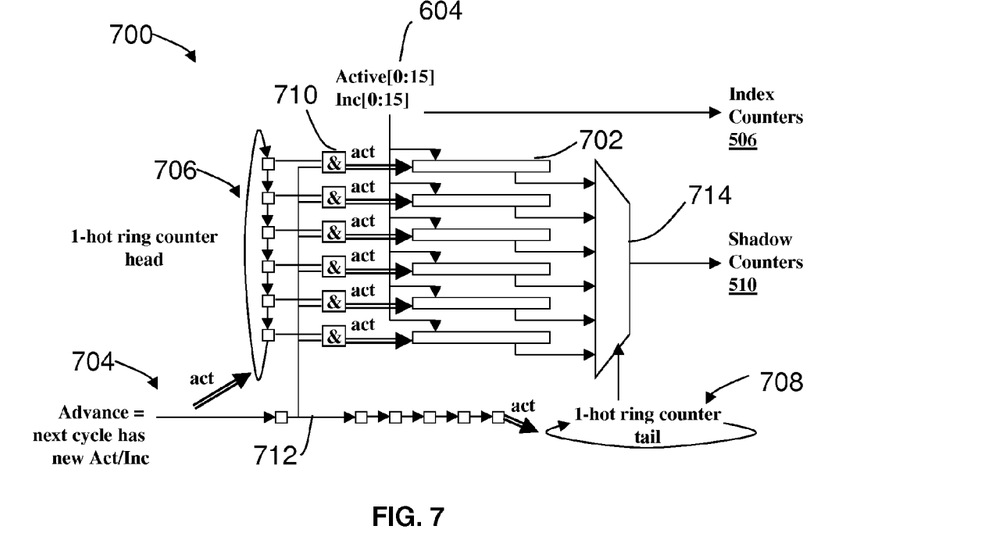
FIG. 7 illustrates a block diagram of counter control delay logic in accordance with an embodiment.

FIG. 7 depicts an alternate embodiment of the multi-cycle delay 606 of FIG. 6 as counter control delay logic 700. The counter control delay logic 700 of FIG. 7 only updates delay registers 702 when a change in state of the counter control signals 604 is detected. In a vector register file, such as the vector register file 600, the control signals change relatively infrequently. Accordingly, by only triggering stores of the control signals on a change of state, power can be saved. For example, if the vector register file 600 includes sixteen vector registers of thirty-two elements each, sequential accesses of elements of one active vector register would result in a series of increments for the active vector register and a series of no activity for the inactive vector registers. If a vector instruction accesses thirty-two elements of a vector register, the control signals for that register's element counter would be "reset" on the instruction's first cycle and "increment" on each of the other cycles.

In an embodiment, the counter control delay logic 700 uses a circular buffer 704 to determine when to advance a one-hot ring counter head 706 and a one-hot ring counter tail 708, where the one-hot ring counter tail 708 lags the one-hot ring counter head 706. The circular buffer 704 advances when the next cycle has different values for the counter control signals 604 than the current cycle. The values of one-hot ring counter head 706 are passed to AND gates 710 associated with each of the delay registers 702. The AND gates 710 also receive a delayed value from circular buffer 704. Accordingly, the AND gates 710 select a single delay register 702 to latch a changed value of the counter control signals 604. The one-hot ring counter tail 708 is a control signal to select one of the delay registers 702 through multiplexer 714 to pass to the shadow counters 510.

For purposes of comparison, assuming a system that includes 5 bits per counter, 16 counters per processing slice, 4 processing slices, and a history of 6 cycles, would result in 1920 bits with 320 clocked per cycle to keep a complete counter history. Using the same system assumptions, but delaying the counter control bits of 6 cycles rather than keeping a complete counter history of 6 cycles would result in 320 bits in shadow counters with up to 80 clocked per cycle and 768 bits of history with 128 clocked per cycle. Running code that changes increment/reset values twice per 32 cycles would result in 17 bits on average clocked per cycle using the embodiment of FIG. 7. Reducing the number of bits clocked per cycle reduces power requirements for rollback support.

Figure 8:
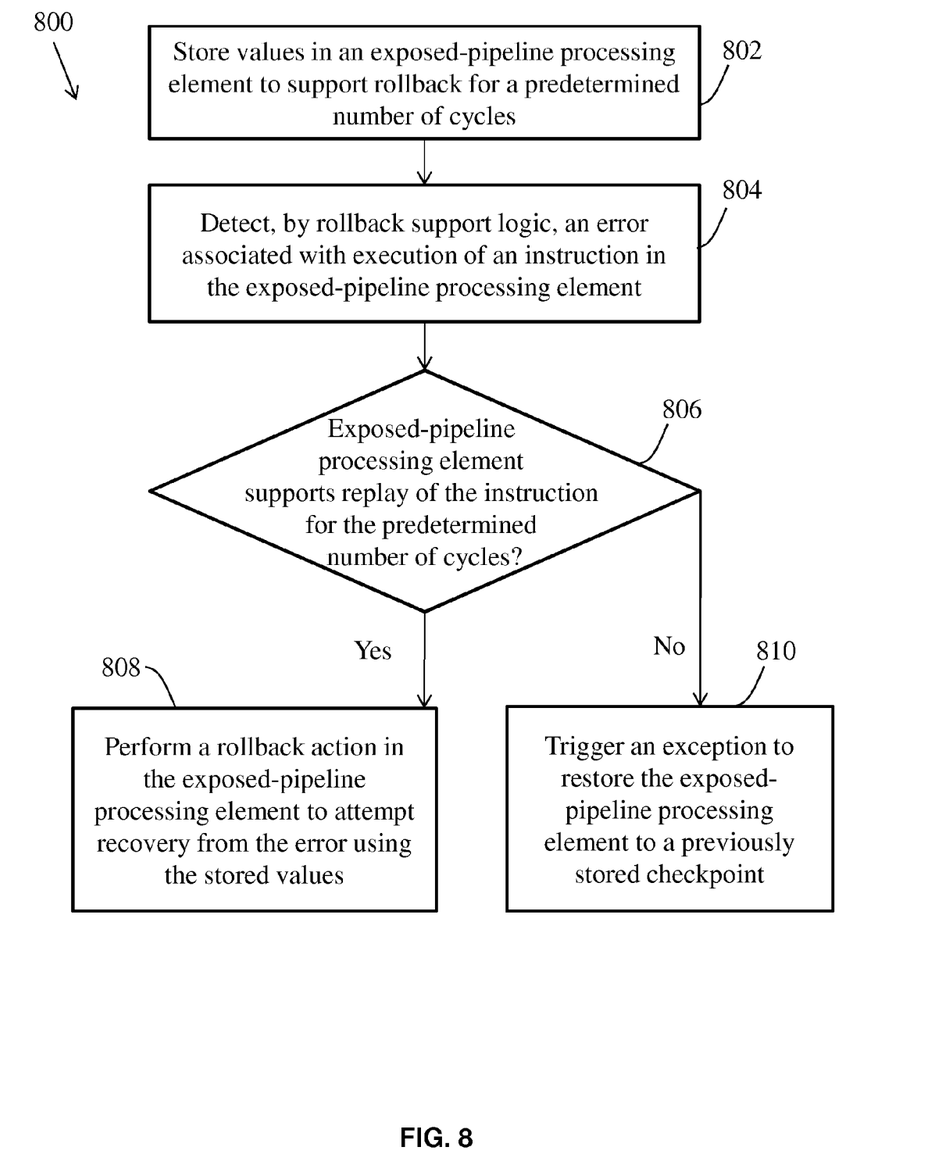
FIG. 8 illustrates a flow diagram of a process for providing rollback support in an exposed-pipeline processing element in accordance with an embodiment.

FIG. 8 is a process 800 for providing rollback support in an exposed-pipeline processing element, such as a processing element of an active memory device. The active memory device may be a three-dimensional memory cube with memory divided into three-dimensional blocked regions as memory vaults, such as the active memory devices of FIGS. 1-4. The blocks depicted in FIG. 8 may be performed upon one of the processing elements of FIGS. 1-4 in an active memory device. For purposes of explanation, the processing element is described in reference to exposed-pipeline processing element 400 of FIG. 4 including rollback support logic 500 of FIG. 5. It will also be understood that the rollback support logic 500 can be implemented in other types of processing circuits and systems, and need not be limited to active memory devices.

The exposed-pipeline processing element 400 in an active memory device may wait for a command. The command can be sent by a requestor to the active memory device to perform one or more actions, where the requestor may be a main processor, a network interface, an I/O device or an additional active memory device in communication with the exposed-pipeline processing element 400. A checkpoint save command received at the PCU 412 can result in saving a checkpoint to memory of the active memory device, including the contents of the VCR 414, SCR 416, and states of a number of units and counters. When commanded to fetch and execute instructions, the exposed-pipeline processing element 400 may fetch an instruction, e.g., a lane instruction, from the instruction buffer 406. The decoder 410 partitions the instruction into sub-instructions and passes the sub-instructions to corresponding functional units for further decoding and processing. One of the sub-instructions may include a read or write command targeting a vector register address of a vector register file, such as an address for accessing VCR 414 and targeting a number of sequential elements.

At block 802, a number of values in the processing element 400 can be stored by the rollback support logic 500. For example, results of ALU pipeline 514 of the exposed-pipeline processing element 400 can be stored to result buffer 518. Results of load-store unit pipeline 516 of the exposed-pipeline processing element 400 can be stored to EA buffer 520. Operands can be stored to operand buffer 512 of the exposed-pipeline processing element 400. Storing to the result buffer 518 may be performed selectively based on determining that a value of the ALU pipeline 514 is used as an operand. Storing to the EA buffer 520 may also be performed based on determining that a value of the LSU pipeline 516 is used as an operand. Storing operands to the operand buffer 512 can be based on a value of an instruction bit set to activate the operand buffer 512.

The rollback support logic 500 can also store current instruction addresses to CIA buffer 526 of the exposed-pipeline processing element 400. Vector length counter values may be stored to vector length counter buffer 528 of the exposed-pipeline processing element 400. A previous version of index counters 506 associated with register files 504 in the exposed-pipeline processing element 400, such as vector register file 600 of FIG. 6, can be stored to shadow counters 510. The shadow counters 510 can include a full history of the index counters 506 over a number of cycles or can be a delayed version of the index counters 506. Counter control signals 604 used to control the index counters 506 can be passed through multi-cycle delay 606 to control the shadow counters 510. The counter control signals 604 may be stored in delay registers 702 of FIG. 7, where the delay registers 702 are updated based on detecting a change in the counter control signals 604. In an embodiment, circular buffer 704 is configured to advance based on detecting the change in the counter control signals 604, where the circular buffer 704 advances a one-hot ring counter head 706 and a one-hot ring counter tail 708. The one-hot ring counter head 706 is combined with a past value 712 of the circular buffer 704 at AND gates 710 to select one of the delay registers 702 to store the counter control signals 604. The one-hot ring counter tail 708 is configured to select one of the delay registers 702 to control the shadow counters 510 through multiplexer 714.

At block 804, the rollback support logic 500 can detect an error associated with execution of an instruction in the exposed-pipeline processing element 400. For example, the error detection logic 530 may detect a bit flip using an error-correcting code, parity, or the like in decode logic 502, register files 504, ALU pipeline 514, LSU pipeline 516, or another unit of the exposed-pipeline processing element 400.

At block 806, the rollback support logic 500 determines whether the exposed-pipeline processing element 400 supports replay of the instruction for the predetermined number of cycles. For example, decode logic 502 can check a state of an instruction bit of the instruction, where the instruction bit is configured to indicate whether the instruction supports rollback and replay.

At block 808, based on determining that the exposed-pipeline processing element 400 supports replay of the instruction, a rollback action is performed in the exposed-pipeline processing element 400 to attempt recovery from the error using the stored values. For example, the rollback action can include selecting one or more of: the result buffer 518, the EA buffer 520, and the operand buffer 512 to replay the instruction for the predetermined number of cycles. Alternatively or additionally, the rollback action can include restoring a current instruction address with a value stored in the CIA buffer 526, and restoring a vector length counter with a value stored in the vector length counter buffer 528. The history of CIA buffer 526 values and vector lengths for each instruction can be used to restore the CIA buffer 526 and vector iteration to their values in a desired earlier cycle. Alternatively or additionally, the rollback action can include restoring the index counters 506 with values from the shadow counters 510.

At block 810, based on determining that the exposed-pipeline processing element 400 does not support replay of the instruction, an exception can be triggered to restore the exposed-pipeline processing element 400 to a previously stored checkpoint. For example, if a checkpoint was previously stored outside of memory of the active memory device, the exposed-pipeline processing element 400 can be restored to the checkpoint if rollback and replay are not otherwise possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for providing rollback support in an exposed-pipeline processing element, the method comprising:
    storing results of an arithmetic logic unit pipeline of the exposed-pipeline processing element to a result buffer selectively based on determining that a value of the arithmetic logic unit pipeline is used as an operand;
    storing results of a load-store unit pipeline of the exposed-pipeline processing element to an effective address buffer based on determining that a value of the load-store unit pipeline is used as an operand;
    storing operands to an operand buffer of the exposed-pipeline processing element;
    detecting, by rollback support logic, an error associated with execution of an instruction in the exposed-pipeline processing element;
    determining, by the rollback support logic, whether the exposed-pipeline processing element supports replay of the instruction for a predetermined number of cycles; and
    based on determining that the exposed-pipeline processing element supports replay of the instruction, performing a rollback action in the exposed-pipeline processing element to attempt recovery from the error by selecting one or more of: the result buffer, the effective address buffer, and the operand buffer to replay the instruction for the predetermined number of cycles.

2. The method of claim 1, further comprising:
    based on determining that the exposed-pipeline processing element does not support replay of the instruction, triggering an exception to restore the exposed-pipeline processing element to a previously stored checkpoint.

3. The method of claim 1, wherein determining, by the rollback support logic, whether the exposed-pipeline processing element supports replay of the instruction further comprises checking a state of an instruction bit of the instruction by decode logic, the instruction bit configured to indicate whether the instruction supports rollback and replay.

4. The method of claim 1, wherein storing operands to the operand buffer is based on a value of an instruction bit set to activate the operand buffer.

5. The method of claim 1, further comprising:
    storing one or more current instruction addresses to a current instruction address buffer of the exposed-pipeline processing element; and storing one or more vector length counter values to a vector length counter buffer of the exposed-pipeline processing element, wherein performing the rollback action comprises restoring a current instruction address with a value stored in the current instruction address buffer, and restoring a vector length counter with a value stored in the vector length counter buffer.

6. The method of claim 1, further comprising:
storing a previous version of a plurality of index counters associated with a plurality of register files in the exposed-pipeline processing element to a plurality of shadow counters, wherein performing the rollback action comprises restoring the index counters with values from the shadow counters.

7. The method of claim 6, further comprising:
passing a plurality of counter control signals used to control the index counters through a multi-cycle delay to control the shadow counters.

8. The method of claim 7, further comprising:
storing the counter control signals in a plurality of delay registers, the delay registers updated based on detecting a change in the counter control signals.

9. The method of claim 8, further comprising:
advancing a circular buffer based on detecting the change in the counter control signals, the circular buffer advancing a one-hot ring counter head and a one-hot ring counter tail, the one-hot ring counter head combined with a past value of the circular buffer to select one of the delay registers to store the counter control signals, and the one-hot ring counter tail configured to select one of the delay registers to control the shadow counters.

10. A method for providing rollback support of an exposed-pipeline processing element in an active memory device, the method comprising:
saving a checkpoint of the exposed-pipeline processing element to memory of the active memory device the active memory device comprising a three-dimensional memory device with the memory divided into three-dimensional blocked regions as a plurality of memory vaults stacked in multiple layers of memory elements;
detecting, by rollback support logic in the exposed-pipeline processing element of the active memory device, an error associated with execution of an instruction in the exposed-pipeline processing element;
determining, by the rollback support logic, whether the exposed-pipeline processing element supports replay of the instruction for a predetermined number of cycles;
based on determining that the exposed-pipeline processing element supports replay of the instruction, performing a rollback action in the exposed-pipeline processing element to attempt recovery from the error using one or more values buffered within the exposed-pipeline processing element; and
based on determining that the exposed-pipeline processing element does not support replay of the instruction, triggering an exception to restore the exposed-pipeline processing element to the checkpoint from one or more of the memory vaults of the active memory device.

11. The method of claim 10, wherein determining, by the rollback support logic, whether the exposed-pipeline processing element supports replay of the instruction further comprises checking a state of an instruction bit of the instruction by decode logic, the instruction bit configured to indicate whether the instruction supports rollback and replay.

12. The method of claim 10, further comprising:
storing results of an arithmetic logic unit pipeline of the exposed-pipeline processing element to a result buffer;
storing results of a load-store unit pipeline of the exposed-pipeline processing element to an effective address buffer; and
storing operands to an operand buffer of the exposed-pipeline processing element, wherein performing the rollback action comprises selecting one or more of: the result buffer, the effective address buffer, and the operand buffer to replay the instruction for the predetermined number of cycles.

13. The method of claim 12, wherein storing to the result buffer is performed selectively based on determining that a value of the arithmetic logic unit pipeline is used as an operand; storing to the effective address buffer is performed based on determining that a value of the load-store unit pipeline is used as an operand; and storing operands to the operand buffer is based on a value of an instruction bit set to activate the operand buffer.

14. The method of claim 10, further comprising:
storing one or more current instruction addresses to a current instruction address buffer of the exposed-pipeline processing element; and
storing one or more vector length counter values to a vector length counter buffer of the exposed-pipeline processing element, wherein performing the rollback action comprises restoring a current instruction address with a value stored in the current instruction address buffer, and restoring a vector length counter with a value stored in the vector length counter buffer.

15. The method of claim 10, further comprising:
storing a previous version of a plurality of index counters associated with a plurality of register files in the exposed-pipeline processing element to a plurality of shadow counters, wherein performing the rollback action comprises restoring the index counters with values from the shadow counters.

16. The method of claim 15, further comprising:
passing a plurality of counter control signals used to control the index counters through a multi-cycle delay to control the shadow counters.

17. The method of claim 16, further comprising:
storing the counter control signals in a plurality of delay registers, the delay registers updated based on detecting a change in the counter control signals.

18. The method of claim 17, further comprising:
advancing a circular buffer based on detecting the change in the counter control signals, the circular buffer advancing a one-hot ring counter head and a one-hot ring counter tail, the one-hot ring counter head combined with a past value of the circular buffer to select one of the delay registers to store the counter control signals, and the one-hot ring counter tail configured to select one of the delay registers to control the shadow counters.

19. A method for providing rollback support in an exposed-pipeline processing element, the method comprising:
storing a previous version of a plurality of index counters associated with a plurality of register files in the exposed-pipeline processing element to a plurality of shadow counters;
passing a plurality of counter control signals used to control the index counters through a multi-cycle delay to control the shadow counters;
detecting, by rollback support logic, an error associated with execution of an instruction in the exposed-pipeline processing element;

determining, by the rollback support logic, whether the exposed-pipeline processing element supports replay of the instruction for a predetermined number of cycles; and based on determining that the exposed-pipeline processing element supports replay of the instruction, performing a rollback action in the exposed-pipeline processing element to attempt recovery from the error by restoring the index counters with values from the shadow counters.

* * * * *